(12) United States Patent
Pampattiwar et al.

(10) Patent No.: US 12,054,093 B2
(45) Date of Patent: Aug. 6, 2024

(54) MULTIFUNCTION LAMP FOR A TRAILER

(71) Applicant: Grote Industries, Inc., Madison, IN (US)

(72) Inventors: Sankalp Pampattiwar, Madison, IN (US); Yogesh Kubal, Madison, IN (US); Cesar Perez-Bolivar, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 18/452,031

(22) Filed: Aug. 18, 2023

(65) Prior Publication Data

US 2024/0140303 A1 May 2, 2024

Related U.S. Application Data

(63) Continuation of application No. 17/556,020, filed on Dec. 20, 2021, now Pat. No. 11,772,547, and a continuation of application No. 17/073,708, filed on Oct. 19, 2020, now Pat. No. 11,203,286.

(51) Int. Cl.
*B60Q 1/30* (2006.01)
*B60Q 3/80* (2017.01)
*H05B 47/19* (2020.01)

(52) U.S. Cl.
CPC .............. *B60Q 1/305* (2013.01); *B60Q 3/80* (2017.02); *H05B 47/19* (2020.01)

(58) Field of Classification Search
CPC ........... B60Q 1/305; B60Q 3/80; H05B 47/19
See application file for complete search history.

(56) References Cited

U.S. PATENT DOCUMENTS

| | | | |
|---|---|---|---|
| 6,897,771 B1 | 5/2005 | Lodhie et al. | |
| 9,616,810 B1 | 4/2017 | Tucker et al. | |
| 2002/0171543 A1 | 11/2002 | Abbe et al. | |
| 2006/0267752 A1 | 11/2006 | Crunk | |

*Primary Examiner* — Joseph L Williams
(74) *Attorney, Agent, or Firm* — Woodard Emhardt Henry Reeves & Wagner

(57) ABSTRACT

A lamp for a vehicle or other object that includes multiple functions. In one aspect, the lamp includes a first circuit for emitting a first color light (such as red light), and at least a second circuit for emitting a second color of light (such as amber light). In another aspect, the lamp optionally includes a microcontroller that may be programmed to control the activation of the different colored lamp circuits based on lamp location information, and based on an operating mode.

18 Claims, 8 Drawing Sheets

*Fig. 15*

| | | Legend |
|---|---|---|
| R | Red | |
| A | Amber | |
| 0 | Off | |
| 1 | First Intensity | |
| 2 | Second Intensity | |

| Ref # | Mode(s) | 1205 | 1210 | 1215 | 1220 |
|---|---|---|---|---|---|
| 1501 | Running Light | R1 | R1 | R1 | R1 |
| 1502 | Running + Braking | R2 | R2 | R2 | R2 |
| 1503 | Running + Braking + Left Turn (Blinking on) | A2 | R2 | R2 | R2 |
| 1504 | Running + Braking + Left Turn (Blinking off) | R1 | A2 | R1 | R1 |
| 1505 | Running + Left Turn (Blinking on) | A2 | A2 | A2 | A2 |
| 1506 | Running + Left Turn (Blinking off) | R1 | R1 | R1 | R1 |
| 1507 | Running + Hazard (Blinking on) | A2 | A2 | A2 | A2 |
| 1508 | Running + Hazard (Blinking off) | R1 | R1 | R1 | R1 |
| 1509 | Running + Braking + Right Turn (Blinking on) | R2 | R2 | R2 | A2 |
| 1510 | Running + Braking + Right Turn (Blinking off) | R2 | R2 | A2 | R1 |
| 1511 | Running + Right Turn (Blinking on) | R1 | R1 | A2 | A2 |
| 1512 | Running + Right Turn (Blinking off) | R1 | R1 | R1 | R1 |
| 1513 | Inactive | 0 | 0 | 0 | 0 |
| 1514 | Braking | R2 | R2 | R2 | R2 |
| 1515 | Braking + Left Turn (Blinking on) | A2 | R2 | R2 | R2 |
| 1516 | Braking + Left Turn (Blinking off) | 0 | R2 | 0 | 0 |
| 1517 | Left Turn (Blinking on) | A2 | A2 | A2 | A2 |
| 1518 | Left Turn (Blinking off) | 0 | 0 | 0 | 0 |
| 1519 | Hazard (Blinking on) | A2 | A2 | A2 | A2 |
| 1520 | Hazard (Blinking off) | 0 | 0 | 0 | 0 |
| 1521 | Braking + Right Turn (Blinking on) | R2 | R2 | R2 | A2 |
| 1522 | Braking + Right Turn (Blinking off) | R2 | R2 | R2 | 0 |

MULTIFUNCTION LAMP FOR A TRAILER

CROSS REFERENCE TO RELATED APPLICATION

This application is a continuation of U.S. patent application Ser. No. 17/556,020 filed Dec. 20, 2021, now U.S. Pat. No. 11,772,547, which is a continuation of U.S. patent application Ser. No. 17/073,708 filed Oct. 19, 2020, now U.S. Pat. No. 11,203,286, which is are hereby incorporated herewith.

BACKGROUND

The present disclosure relates to lamps capable of performing multiple functions such as in the case of a vehicle tail lamp, turn signal, and/or brake lamp. Vehicle lamps are commonly designed for a specific function or location in the vehicle, and are usually activated or deactivated by supplying power on a dedicated circuit at specific times to perform the specific functions. For example, brake lights are generally red and are activated by receiving power on a brake lamp cable used only for brake lamps when the braking system is activated. On the other hand, turn signal lamps are generally amber and are activated upon receiving power on a separate turn signal power cable when a turn signal is activated. Thus, each lamp is designed for a specific function, includes colored lamps or lenses specific to that function, and obtain power from a dedicated circuit. This makes it difficult if not impossible for a single lamp to perform more than one function.

SUMMARY

Disclosed is a multifunction lamp and lighting system for a trailer that enables a single lamp to perform multiple functions, or for multiple lamps to operate according to different combinations of functions at different times. The disclosed lamp may include a control circuit, a sense resistor, at least one red circuit, and at least one amber circuit. In another aspect, the red circuit and the amber circuit may be controlled to emit red or amber light based on commands optionally received from the vehicle by the control circuit.

In another aspect, the control circuit may have a memory that includes location information for a multifunction lamp. The memory may store information such as the location of the lamp in the vehicle, activation and deactivation schemes specific to one or more modes of operation, and/or the colors the lamp may be configured to emit for each mode, or combination of modes.

In another aspect, the sense resistor optionally determines the health of the lamp by reading current values for the lamp circuits. If the lamp is nearing its end of life a notification may be sent to a user to replace or repair the lamp.

In another aspect, the lamp may be programmed via wireless communications with the control circuit having a wireless receiver and a wireless transmitter. In one example, the wireless protocol conforms to the Bluetooth protocol for wireless communication.

In another aspect, the lamp includes different color circuits. For example, a red circuit and an amber circuit each having different light emitters such as Light Emitting Diodes (LEDs), colored incandescent light bulbs, or other light emitter. In another example, the disclosed lamp may include a blue circuit, white circuit, green circuit, and/or a red circuit for use in emergency vehicles. Alternatively, the vehicle may include a lamp with only a single-color circuit. For example, reversing lights with a white circuit.

In another aspect, the multifunction lamp may receive a command from the vehicle, for example a breaking command, turn signal command, etc. The control circuit optionally combines the command with the stored location information of the lamp to send a signal to one or more switching devices in the lamp to close the switching device and thereby activate the appropriate colored circuit.

In another aspect, the lamp may emit different colors of light at multiple different intensities. For example, the lamp may emit light at a first intensity or a second intensity where the second intensity may be greater than the first intensity.

Further forms, objects, features, aspects, benefits, advantages, and examples of the present disclosure will become apparent from the accompanying claims, detailed description, and drawings provided herewith.

BRIEF DESCRIPTION OF THE DRAWINGS

FIG. 15 is a table illustrating examples of modes and combinations of modes that may be implemented using the disclosed multifunction lamps.

DETAILED DESCRIPTION

Figure 1:
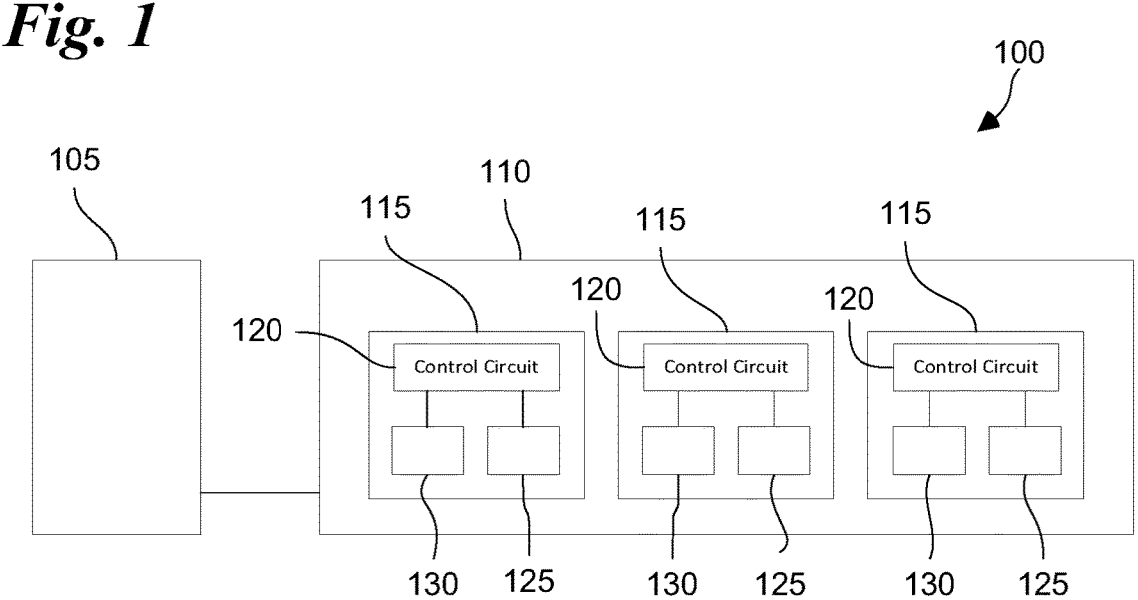
FIG. 1 is a component diagram showing one example of a vehicle that includes the disclosed multifunction lamps.

FIG. 1 shows an example of a vehicle that may include the disclosed multifunction lamp. In FIG. 1, the vehicle is a tractor-trailer 100, but the disclosed multifunction lamps may be useful in any vehicle. The tractor-trailer 100 includes a tractor 105 coupled to a trailer 110, both mechanically to pull the trailer, and/or electrically so as to communicate with and provide power to the trailer. Thus trailer 110 may be configured to be pulled by the tractor 105 and to electrically connect to the tractor 105. The trailer 110 may include one or more multifunction lamps 115. The multifunction lamps 115 optionally further include a control circuit 120. The control circuit 120 may be electrically connected to a multiple different colored circuits such as a first circuit 125 and a second circuit 130, the first and second circuits optionally including lamps of different colors such as red lamps in the first circuit 125, and amber lamps in the second circuit 130. The first circuit 125 and the second circuit 130 are optionally housed within the multifunction lamp 115. This configuration allows for a single lamp to emit multiple different colors of light at different times or at the same time.

In another aspect, the multifunction lamp 115 may include any suitable number of different colored lamp circuits, and may be operated in other scenarios besides a vehicle trailer. For example, the lamp may include three or more lamp circuits of different colors, five or more lamp circuits, or 10 or more different lamp circuits. These individual lamp circuits may be configured to produce one or more different colors of light. For example, a multifunction lamp 115 may include a red circuit and an amber circuit useful for multifunction lamps in a vehicle or trailer. In another example, the disclosed multifunction lamp may include an amber circuit and a white circuit which may be useful for a tow truck, for farm equipment, for construction equipment, or for road hazard warning signals. Such signals may be mounted on stationery mounts such as on bridges, signs, or barriers, or they may be mounted on mobile mounts such as on portable signs, road cones, or barrels. In yet another example, the disclosed lamps may include a red circuit and a white circuit, or a blue circuit, a red circuit, and/or a white circuit which may be useful for emergency vehicles.

Figure 2:
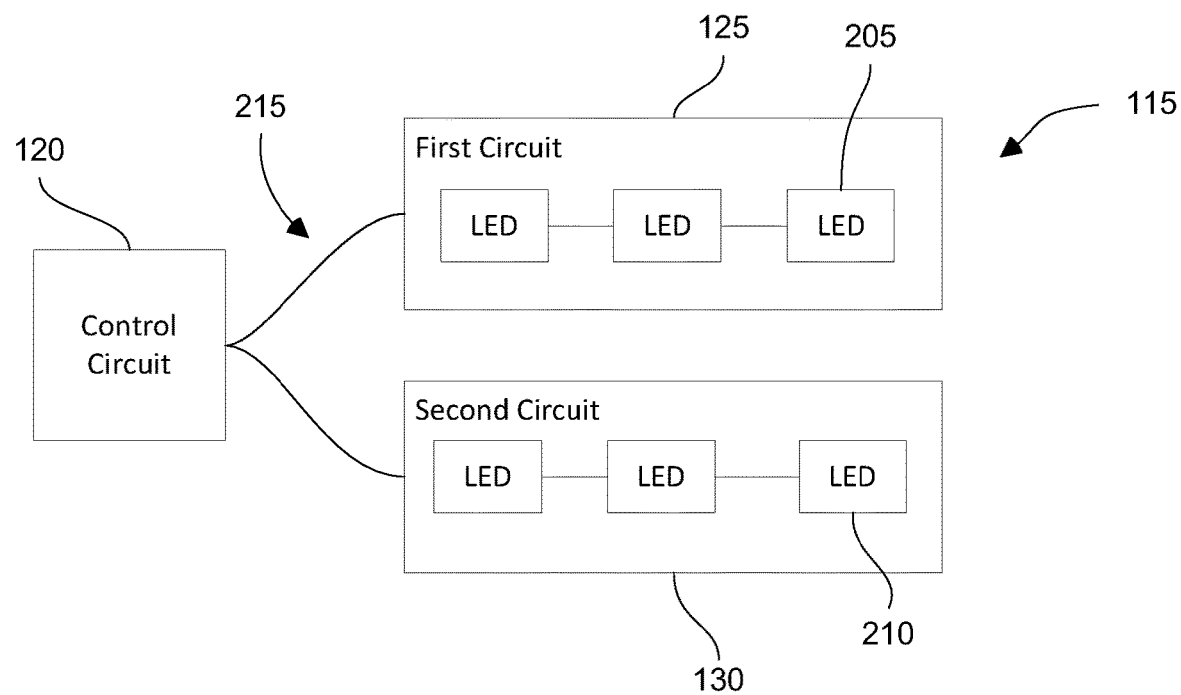
FIG. 2 is a component diagram illustrating optional additional aspects of the multifunction lamps of FIG. 1.

Turning to FIG. 2, one example of the components of the disclosed multifunction lamp is shown in more detail. In this example, the multifunction lamp 115 includes the first circuit 125, and second circuit 130. The first circuit 125 may include one or more red LEDs 205 and the second circuit 130 may include one or more amber LEDs 210. The red LEDs 205 and the amber LEDs 210 may be electrically connected to the control circuit 120 by one or more electrical connections 215. LEDs 205, and 210 may be configured to emit red and amber light respectively when activated by the control circuit 120, or they may be configured to emit other colors as discussed above. In another aspect, the diodes of circuit 125 may be red, amber, white, blue, or another color, or any combination of colors. In another aspect, diodes of circuit 130 may be any suitable color, or combination of colors, which may be the same color or combination of colors as the diodes of circuit 125. Where the diodes of 125 and 130 are the same color, the function provided by the multifunction lamp may include emitting the same color at varying intensities. By activating circuit 125 to achieve illumination at one intensity, and activating both 125 and 130 to achieve light emission at a second higher intensity. In another aspect, the lamp may include other types of light emitting devices. For example, HID lamps, halogen lamps, and the like. In another aspect, the electrical connection 215 may be a hardwired or a wireless connection depending on the application.

Figure 3:
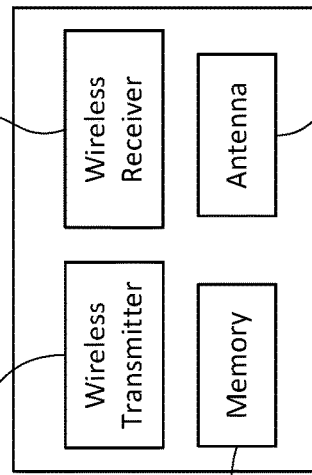
FIG. 3 is a component diagram illustrating optional additional aspects of the control circuit of the preceding figures.

FIG. 3 shows an example of a control circuit 300 that includes components that may be included in the disclosed control circuits discussed herein. For example, the disclosed control circuits may include a wireless transmitter 305 and a wireless receiver 310, one or both of which may be electrically connected to one or more antennas 320. The control circuits may optionally include a memory 315 for storing information about the operational history, modes of operation, status, or other aspects of a multifunction lamp like those disclosed herein. In one aspect, the wireless transmitter 305 may communicate wirelessly with a vehicle such as vehicle 105 to indicate lamp status. For example, if one or more LED's have failed, or if one or more of the separate lamp circuits has failed, or if the lamp assembly is otherwise malfunctioning.

In one aspect, the wireless receiver 310, may include a Bluetooth receiver configured to receive wireless communications from another control system such as a vehicle controller that is configured to communicate using the Bluetooth protocol. In another example, the wireless receiver 310 may communicate with a control system implemented in software in a remote computing device such as a smart phone, server computer, and the like. In this example, wireless receiver 310 may communicate according to any suitable wireless protocol such as via WiFi, Near Field Communication (NFC), Bluetooth, and others.

In another aspect, the wireless receiver 310 may be configured to receive programming information for another control circuit using any suitable wireless protocol such as via WiFi, Bluetooth, or others. In another aspect, the wireless receiver 310 may optionally be configured to receive location information defining the position of the lamp on the vehicle, trailer, or other object. This location information may be stored in the memory 315 and used by the disclosed control circuits. In one aspect, the location information may be useful for determining the available functions or operating modes of the lamp. For example, a tail lamp may have 3 or 4 operating modes, whereas a side marker lamp may only have 1 or 2 operating modes. In another aspect, the location information may be programmed into the control circuit 120 during manufacturing, during installation, when maintenance is performed, or at any other time.

Figure 4:
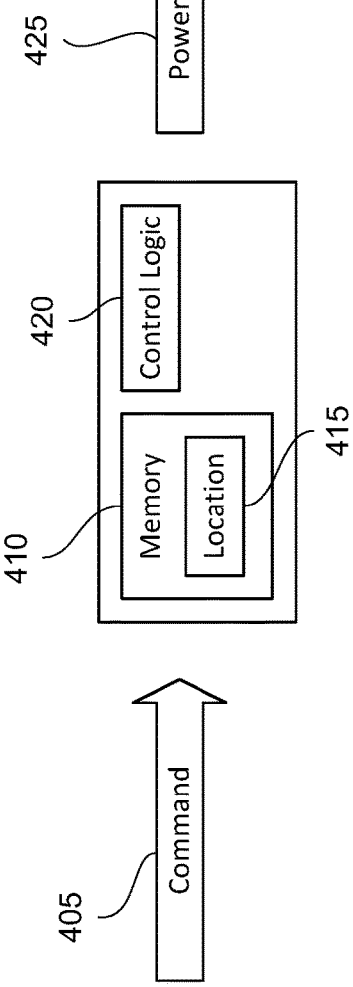
FIG. 4 is a component diagram illustrating optional additional aspects of the control circuit of the preceding figures.

FIG. 4 illustrates a control circuit 400 like those disclosed herein operating to control power to the disclosed lamp circuits. For example, the control circuit 400 may receive commands or inputs 405 which may result in power being selectively supplied to a load, such as one or more lamp circuits. The command input 405 may be processed according to one or more rules, or by other automated decision making processes executed within, or as part of, control logic 420. Control logic 420 may combine the command with location information 415. The command input 405 may, for example, be generated from user input. A user may provide this input in any suitable manner, such as by stepping on the brake pedal to generate a braking command. In another example, a user may activate the vehicle running lights, or activate a turning signal. These actions may automatically generate command input 405, which taken in combination with location 415 of the lamp, and other control logic 420, may produce an output power 425. The power output 425 may include providing power to selectively activate one or more circuits in the lamp, and/or selectively deactivate one or other circuits in the lamp to thereby generate different illumination colors. In another aspect, command input 405 may include multiple commands such as in the case where multiple actions are taken together (e.g. turn signal and braking, hazard and braking, and the like).

Thus, the command information may be combined with the location information 415 that is optionally programmed into the disclosed multifunction lamps to produce an output for activating or deactivating one or more lamp circuits. The location information 415 may be used to indicate to the control circuit 400 which illumination or operation modes are being requested. For example, a left turning command will cause multifunction lamps in the left turn signal location to activate, in this case, intermittently. Lamps located in the right turn signal location would, in this situation, remain inactive. They system optionally delivers all command input 405 to all lamps at all locations in the vehicle, and the individual lamps may then be configured or programmed to activate or deactivate based on location 415 and control logic 420. Once the command 405 signal has been decoded by the disclosed control circuits, the control circuit is configured to then supply power signal to the proper circuit within the lamp. For example, for a braking command, the power may be supplied to a red circuit such as circuit 125 of the multifunction lamp 115. In another example, the command input may include a braking command and a turning command resulting in power to a red circuit and an amber circuit like circuit 130.

Figure 5:
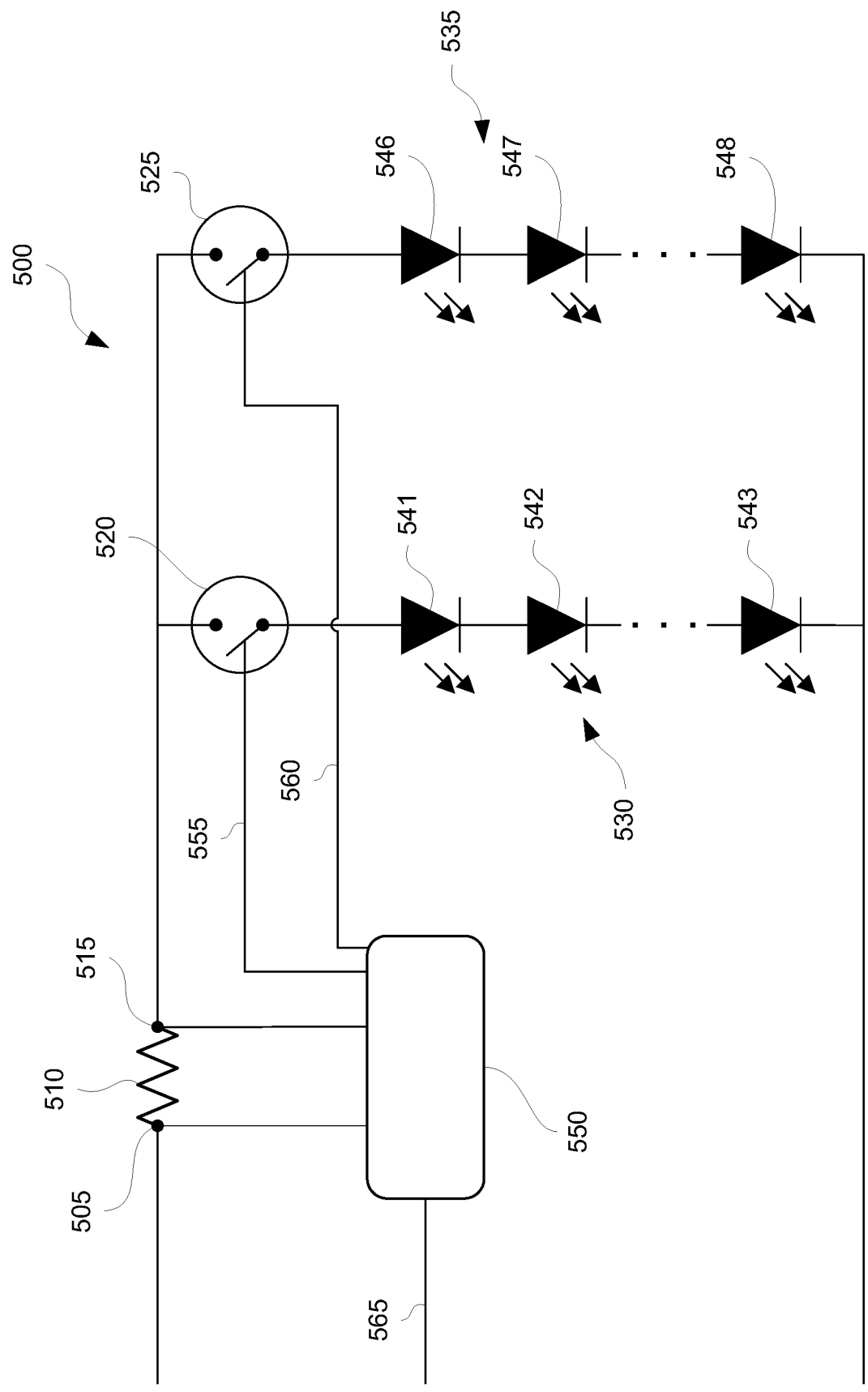
FIG. 5 is a schematic diagram of one example of a circuit that may be used in the multifunction lamps of the preceding figures.

FIG. 5 provides another example of a multifunction lamp 500 that includes components that may be included in any of the disclosed examples. The disclosed multifunction lamps may include a sense resistor 510 that is optionally electrically connected in series with one or more circuits 530 and 535. Circuits 530 and 535 may include multiple diodes 541-543 and 546-548 respectively, where the diodes of each circuit may be of different colors. For example, diodes 541-543 may be red, amber, white, blue, or another color. In another aspect, diodes 546-48 may be any suitable color which may be the same color as the diodes of circuit 530, or of a different color. Where the diodes of 530 and 535 are the same color, or the same combination of colors, the function provided by the multifunction lamp may be to display the same color at varying intensities by activating circuit 530 to achieve illumination at one intensity, and activating both 530 and 535 to achieve illumination at a second higher intensity.

A control circuit 550 may be electrically connected at nodes 505 and 515 so that the current passing through a sense resistor 510 may be determined by control circuit 550. The control sensor 550 may thus be configured to monitor the current flowing through circuits 530 and 535. The control circuit 550 is optionally configured to detect deviations in current flow and compare them to predetermined thresholds. If the current flow falls outside the predetermined upper and lower limits, it may indicate that either circuit 530 or 535, or both circuits, has one or more LEDs that have failed. This may indicate that maintenance is required, and control circuit 535 may initiate notification of the failure.

In another aspect, control circuit 550 is electrically connected to switches 520 and 525. Switch 520 is optionally electrically connected in series with circuit 530, and switch 525 is optionally electrically connected in series to circuit 535. In this way, switch 520 is configured to control power to selectively activate and deactivate the LEDs of circuit 530, and switch 525 is configured to control power to selectively activate and deactivate the LEDs of circuit 535. The switches 520 and 525 may be electrically connected to control circuit 550 by a control line 555 and 560 respectively. Control circuit 550 may thus control the flow of power to LED circuits 530 and 535 by selectively controlling switches 520 and 525 to open and close. For example, when the control circuit 550 receives a command via an input line 565, control circuit 550 optionally controls switch 520 to close activating circuit 530 having a first group of LEDs, and optionally controls switch 525 to open deactivating circuit 535 having a second group of LEDs. The end result is for a current to flow through the circuit 530 energizing LEDs 541-543. The energized LEDs 541-543 thus emitting light, such as red light when a vehicle is braking, amber light if the vehicle is turning, blue light for a police or other emergency vehicle, or any other suitable color. Alternatively, LEDs switch 520 may be opened by control circuit 550 deactivating LEDs 541-543, and switch 525 may be closed activating circuit 535 and providing power to 546-548. These LEDs 546-548 may emit red light, amber light, or any other color that is the same or different as the LEDs of circuit 530.

Figure 7:
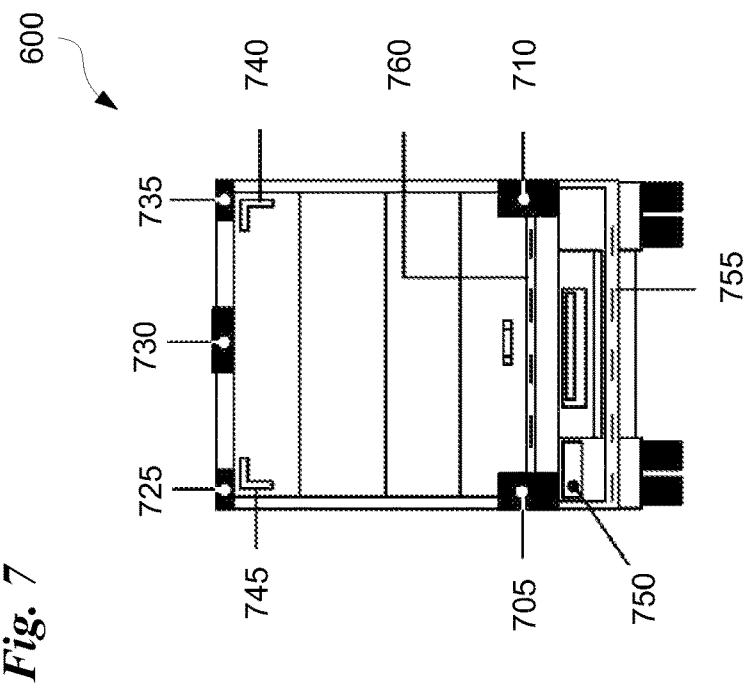
FIG. 7 is a rear view of the box type semi-trailer of FIG. 6.
Figure 6:
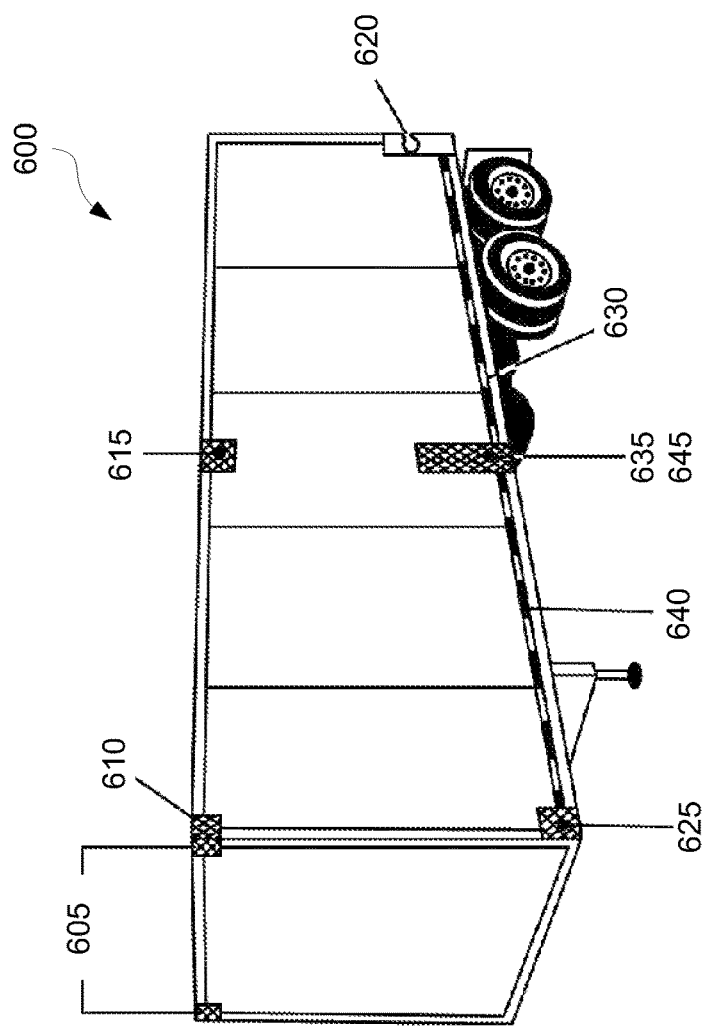
FIG. 6 is a perspective view of a box type semi-trailer.
Figure 9:
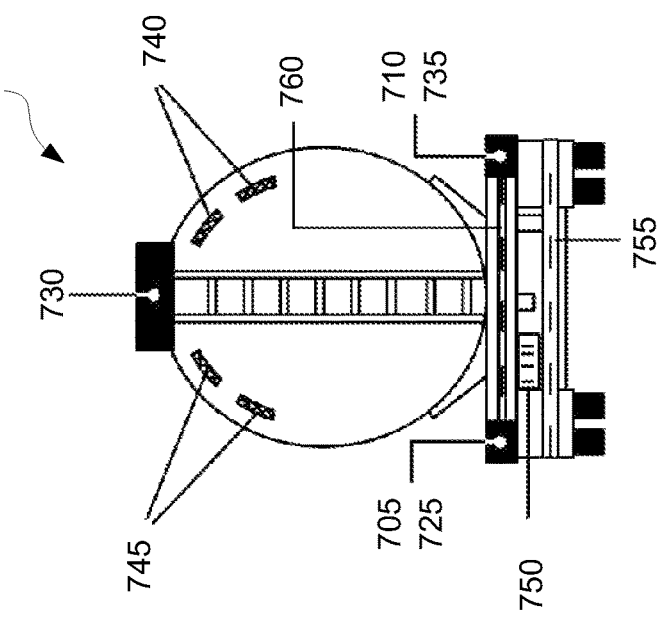
FIG. 9 is a rear view of the tanker type semi-trailer of FIG. 8.
Figure 8:
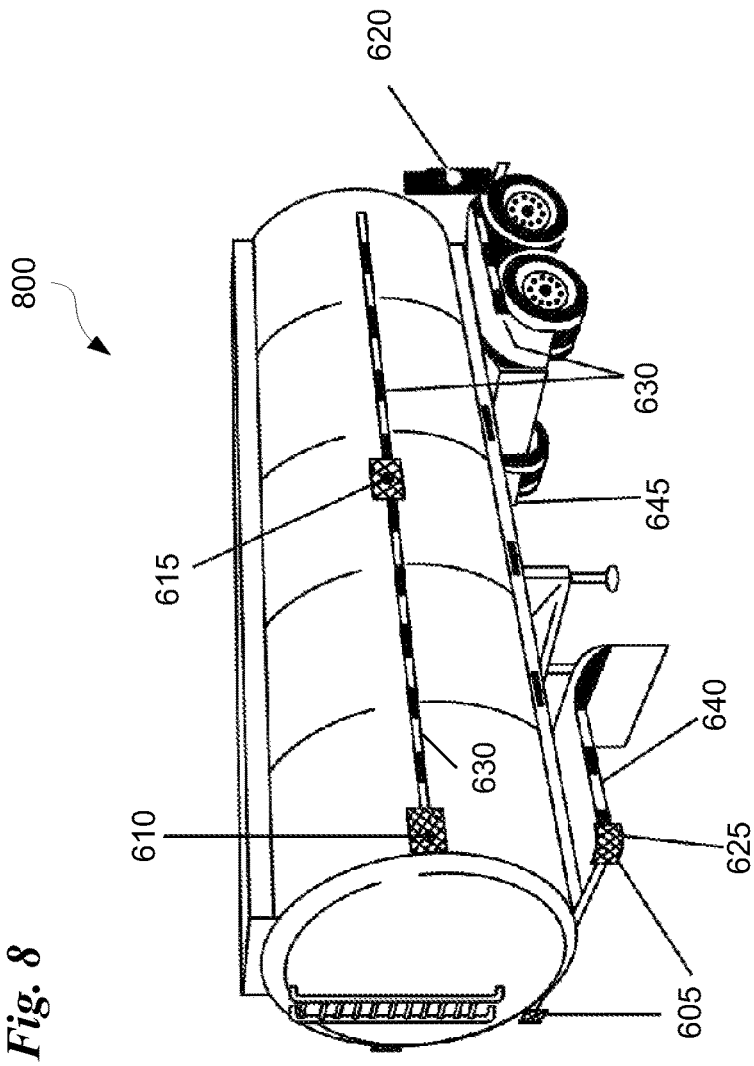
FIG. 8 is a perspective view of a tanker type semi-trailer.
Figure 10:
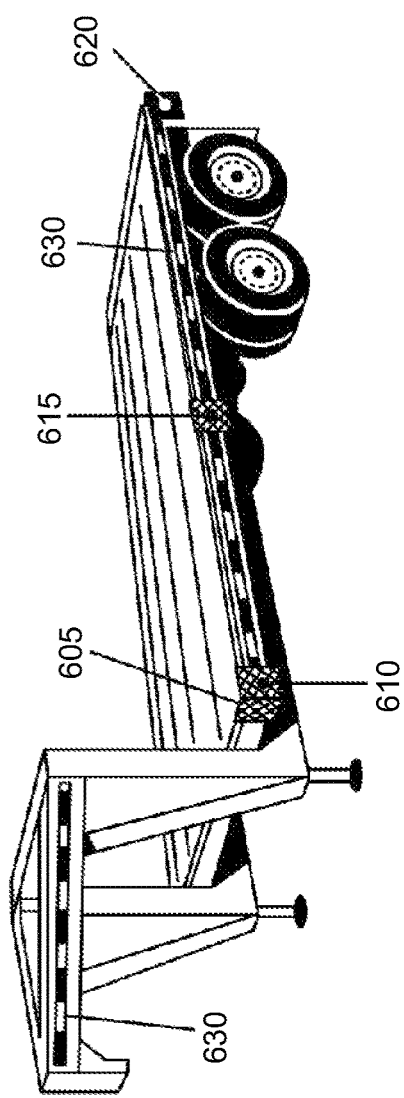
FIG. 10 is a perspective view of a flatbed type semi-trailer.

FIGS. 6-11 illustrate different examples of locations where the disclosed multifunction lamps may be located. These illustrations are illustrative of the requirements for semi-trailers as indicated in the Federal Motor Vehicle Safety Standards (FMVSS) for lamps and reflective devices found in 49 CFR 393.11. Some trailers may include different mounting positions or additional lighting or other trailer components. The disclosed lamps may be mounted in any suitable location on a trailer or other object, and thus FIGS. 6-11 are meant to be illustrative and are not be considered restrictive. FIGS. 6, 8, and 10 generally refer to the left side of the trailers and the lamps and reflectors that are positioned accordingly. The right side of theses trailers is not visible in the present figures, but references to "left side" are generally applicable to the "right side" of the trailer. Thus lamps at the left side locations are optionally present on the right side of the trailer as well.

FIGS. 6 and 7 illustrate one example of a dry van or box type trailer 600 that includes the disclosed multifunction lamps at different locations on the trailer, the multifunction lamps configured to emit light of different colors depending on the location and the mode of operation. The trailer 600 optionally includes multifunction lamps positioned to operate as front clearance lamps 605, upper front left side marker lamps 610, and upper intermediate left side marker lamps 615. The trailer optionally includes other multifunction lamps operable to function as lower front left side marker lamps 625, side marking 640, side marking 630, left side rear marker lamps and reflex reflectors at 620, and lower intermediate side marker lamps 635 which may be mounted adjacent intermediate side reflex reflectors 645.

In FIG. 7, trailer 600 optionally includes multifunction lamps at locations such as one or more left rear clearance lamps 725, rear identification lamps 730, right rear clearance lamps 735, rear upper body marking 740, and rear upper body marking 745 are arranged along the top portion of the rear of the trailer. Along the bottom of the trailer are left rear stop turn tail lamps and reflex reflectors 705, and right rear stop turn tail lamps and reflex reflectors 710 arranged on opposite sides, license plate lamp(s) 750 providing lighting around the license plate area, bumper bar marking 755 providing markings near the bottom rear of the truck trailer. and rear lower body marking 760 extending between locations 705 and 710.

FIGS. 8 and 9 illustrate one example of a bulk liquid or tanker trailer 800 that optionally includes the disclosed multifunction lamps operating as upper front left side marker lamps 610 and upper intermediate left side marker lamps 615 mounted along the sides of the trailer about midway up the side of the bulk liquid container portion. Trailer 800 may include multifunction lamps operating as front clearance lamps 605, lower front left side marker lamps 625, side marking 640, side marking 630 mounted along the lower sides, and left side rear marker lamps at 620. These may be mounted in conjunction with intermediate side reflex reflectors 645, and/or with reflex reflectors also mounted at 620. In this example, one or more multifunction lamps may be operable as rear upper body marking lamps 740, rear identification lamps 730, and rear upper body marking lamps 745 arranged in a clockwise configuration going around the upper portion at the rear of the trailer. Rear upper body marking 740, and rear upper body marking 745 are arranged along the top portion of the rear of the trailer. Along the bottom of the trailer are positions where the disclosed lamps may operate as left rear stop turn tail lamps 705 (optionally including reflex reflectors) which may be mounted adjacent left rear clearance lamps 725, and right rear stop turn tail lamps 710 (also optionally including reflex reflectors) which may be mounted adjacent right clearance lamps 735. These may be arranged on opposite sides, bumper bar marking 755 provides markings near the bottom rear of the truck trailer.

Figure 11:
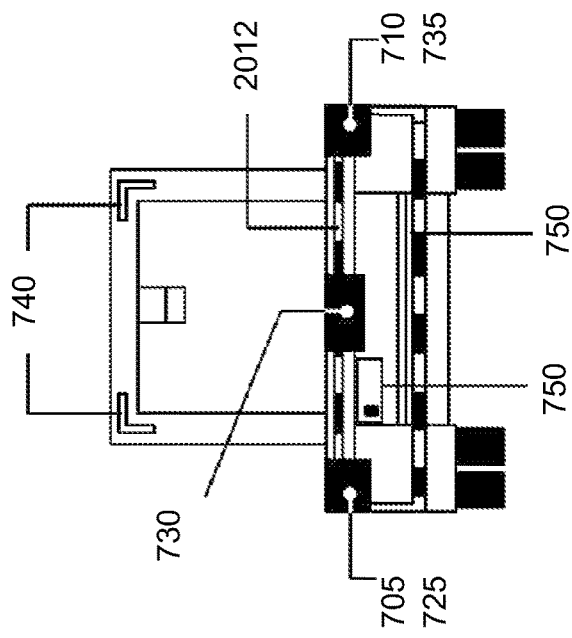
FIG. 11 is a rear view of the flatbed type semi-trailer of FIG. 10.

FIGS. 10 and 11 illustrate an example of a gooseneck flatbed trailer 1000 that optionally includes one or more of the disclosed multifunction lamps operating as side marking 630 along the gooseneck portion of the trailer, front clearance lamps 605, upper front left side marker lamps 610, upper intermediate left side marker lamps 615, side marking 630, and left side rear marker lamps 620, which may be mounted adjacent reflex reflectors as well along the sides of the flatbed portion. The disclosed lamps may be positioned and operable as one or more rear upper body markings at 740 optionally arranged on the rear of the gooseneck portion while lamps operating as left rear stop turn tail lamps 705 (with or without reflex reflectors), rear upper body marking 745, intermediate rear identification lamps 730, right rear stop turn tail lamps 710 (optionally with reflex reflectors) may be mounted along the rear of the flatbed portion of the trailer. Other optional positioning may be as bumper bar marking 750 on the lower extremity of the rear bumper bar.

Figure 12:
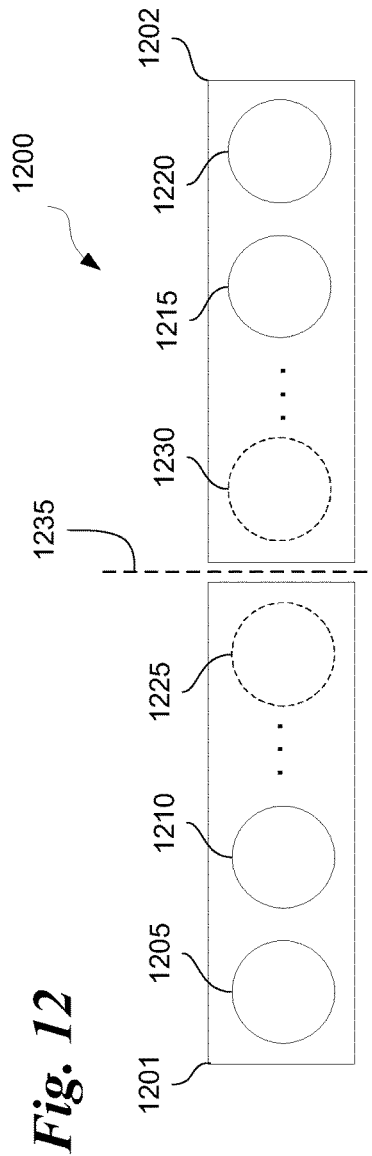
FIG. 12 illustrates one example of a lighting configuration using the disclosed multifunction lamps.

FIG. 12 illustrates at 1200 one example of what may be called a "horizontal" lighting arrangement for the disclosed lamps. The disclosed lamps may be positioned as shown at 1200 in any one or more of the locations around a vehicle, trailer, or other object. These locations include, but are not limited to positions shown in FIGS. 6-11. The horizontal lighting arrangement 1200 may include a left side 1201 and a right side 1202. The left side 1201 and the right side 1202 may optionally be mirror images of one another on a centerline axis 1235 that may be equidistant between 1201 and 1202. The axis 1235 may be the center line of a trailer when viewed from the rear, from the side, from the top, or from some other advantageous perspective. For example, with respect to FIGS. 7, 9, and 11, axis 1235 may pass through the centerline of the trailers shown in those figures such that left side 1201 may be at 705, and right side 1202 at 710. In another aspect, centerline 1235 may be more local to a region or position on the trailer such as a lamp assembly and thus the centerline may denote the centerline of that particular assembly of lamps, an assembly that may be duplicated in multiple places around the vehicle. For example, arrangement at 1200 may appear at 615 and 610 in FIGS. 6, 8, and 10. In this configuration, axis 1235 is local to those positions on the trailer. In another example, arrangements 1200, 1300, 1400, or some other arrangement may be used in a light bar for an emergency vehicle such as a police car, fire truck, ambulance, and the like. In this case, the axis 1235 may be the center of the light bar which may be mounted in any location around the vehicle, and the colors of the lamps may vary accordingly and may include red, white, blue, amber, green, or other colors.

The left side 1201 optionally includes at least one primary lamp 1205 which may also be thought of as an "outside" lamp, and at least one secondary lamp 1210 which may be thought of as an "inside" lamp. The arrangement may include optional additional secondary (or inside) lamps 1225. The terms "inside" and "outside" are here used to denote the relative position of lamps in the arrangement relative to other lamps in the arrangement. These terms may also coincide with the extremities of the vehicle where "outside" may mean closer to an end or side of the trailer, and "inside" may mean further from the end or side.

Similarly, the right side may include at least one secondary lamp 1215 and optionally at least one primary lamp 1220 with optional additional secondary lamps 1230. In one aspect, the primary and secondary lamps are circular in shape. In another aspect, the primary and secondary lamps are rectangular in shape. In yet another aspect, the primary and secondary lamps optionally include multiple different shapes that may be rectangular, circular, ovular, or any suitable shape.

Figure 13:
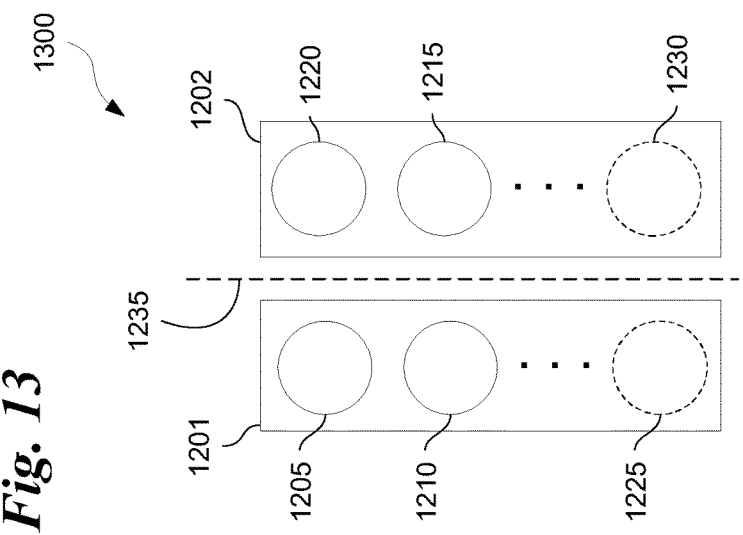
FIG. 13 illustrates another example of a lighting configuration using the disclosed multifunction lamps.

FIG. 13 illustrates at 1300 one example of a vertically oriented lighting arrangement that may be used with respect to the disclosed multifunction lamps positioned in any suitable location around a trailer or vehicle. As discussed above with respect to FIG. 12, the vertical arrangement at 1300 may be symmetrical around axis 1235 which may be the midline of the whole vehicle, or a central axis specific to the individual assembly.

The arrangement 1300 includes left side 1201 and right side 1202. The left side 1201 may include at least one primary lamp 1205 and at least one secondary lamp 1210. Similarly, the right side may include at least one secondary lamp 1215 and at least one primary lamp 1220.

Figure 14:
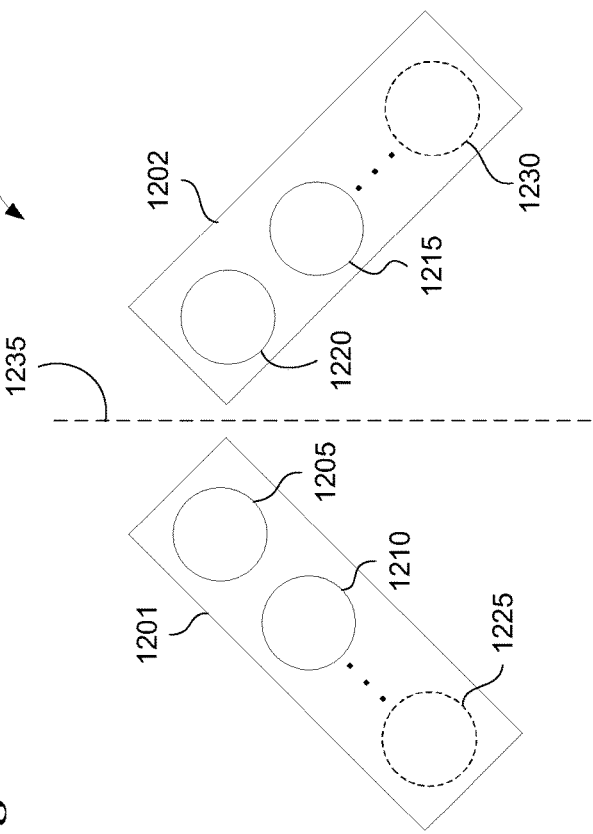
FIG. 14 illustrates a third example of a lighting configuration using the disclosed multifunction lamps.

FIG. 14 illustrates at 1400 another example of a lighting arrangement that may be used with respect to the disclosed multifunction lamps. The arrangement 1400 illustrates an alternative placement in a "diagonal" or slanted format. As discussed above with respect to FIG. 12, the arrangement at 1400 may be symmetrical around axis 1235 which may be the midline of the vehicle, or a central axis specific to the individual assembly.

The arrangement 1400 includes the disclosed left side 1201 and the right side 1202, each having one or more of the disclosed multifunction lamps. The left side 1201 may include at least one primary lamp 1205 and at least one secondary lamp 1210. Similarly, the right side may include at least one secondary lamp 1215 and at least one primary lamp 1220.

The lamp positions shown in FIGS. 12-14 are not restricted in terms of placement on a trailer. For example, the horizontal lighting arrangements 1200 may be located across the lower rear of a trailer. In another aspect, the lamps may be placed across the upper rear of the trailer according to arrangement 1200. In another aspect, the vertical lighting arrangement 1300 may be located across the left, right, and/or intermediate portion of the rear of the trailer. In yet another aspect, the diagonal arrangement 1400 may appear at the rear of a trailer like the one shown in FIGS. 8 and 9 where the rear of the trailer is rounded such as in the case of a circular or oval shaped tanker trailer.

Shown in FIG. 15 are examples of operating modes that may be implemented using the disclosed multifunction lamps. Others may be implemented according to the present disclosure, and thus FIG. 15 is merely illustrative and not restrictive or representative of a closed set of possible outcomes. These examples are provided in the context of a trailer coupled to a truck, but the disclosed lamps and modes are not restricted only to this configuration of vehicle and trailer. For example, the lamps and modes disclosed may be useful for a truck, bus, or other vehicle with or without a trailer.

In one example, at 1501, the vehicle running lights are on, and no other command inputs are received, 1205, 1210, 1215, and 1220 may activate a red circuit at a first lower intensity. At 1502, the running lamps are activated when the brake is applied resulting in all four lamps 1205, 1210, 1215, and 1220 emitting red light at a second intensity that is higher than at 1501 when the running lights alone are active without braking. The intensity levels correspond to the brightness level, or number of lumens emitted, by the multifunction lamp. For example, a first intensity may emit a dimmer red or amber light whereas a second intensity may emit a brighter red or amber light. In these examples, the second intensity is generally greater than the first intensity.

In another example at 1503 and 1504, the running lamps are active, the brake is applied, and the left turn signal is activated. In this scenario, the left primary lamp 1205 blinks, by alternating between emitting amber light at a second intensity higher intensity and red light at a first lower intensity. In this example, the left secondary lamp 1210, right secondary lamp 1215, and right primary lamp 1220 emit red light at a second higher intensity.

In another example a 1511 and 1512, the running lights are active and a right turn command is sent to the multifunction lamp. The left primary lamp 1205 and the left secondary lamp 1210 emit red light at a first intensity, and the right secondary lamp 1215 and the right primary lamp 1220 blink by alternating between emitting amber light at a second intensity and red light at a first intensity.

At 1507 and 1508, the running lights and hazard lights are active together. In this mode, the left primary lamp 1205, the left secondary lamp 1210, the right secondary lamp 1215, and the right primary lamp 1220 blink by alternating between emitting amber light at a second intensity and red light at a first intensity.

At 1521 and 1522, the running lights are off, the brake is applied, and the right turn signal is activated. In this example, the left primary lamp 1205, the left secondary lamp 1210, and the right secondary lamp 1215 emit red light at a second intensity, the right primary lamp 1220 blinks by alternating between emitting amber light at a second intensity and emitting no light.

At 1517 and 1518, the running lights are off and the left turn signal is activated causing the left primary lamp 1205 and the left secondary lamp 1210 to blink by alternating between emitting amber light at a second intensity and emitting no light while the right secondary lamp 1215 and right primary lamp 1220 emit no light.

In another example at 1519 and 1520, the running lights are off and the hazard lights are active resulting in the left primary lamp 1205, left secondary lamp 1210, right secondary lamp 1215, and right primary lamp 1220 blinking by alternating between emitting amber light at a second intensity and emitting no light.

At 1514, the brakes are activated resulting in the left primary lamp 1205, left secondary lamp 1210, right secondary lamp 1215, and right primary lamp 1220 emit red light at a second higher intensity.

Other examples of the disclosed concepts include the following numbered examples:

Example 1

A lamp for a trailer, comprising:
a red circuit that includes multiple red lamps electrically connected together and an amber circuit that includes multiple amber lamps electrically connected together.

Example 2

The lamp of any previous example, further comprising:
a control circuit electrically connected to the red and amber lamps.

Example 3

The lamp of any previous example, further comprising:
a sense resistor electrically connected in series with the red and amber lamp circuits; wherein the control circuit is electrically connected to the sense resistor and configured to detect changes in the voltage or current for the red or amber lamps using the sense resistor.

Example 4

The lamp of any previous example, wherein the lamp includes a memory for storing a location of the lamp in the trailer.

Example 5

The lamp of any previous example, wherein the control circuit is configured to control power to the lamp circuits based on a combination of commands received by the control circuit and the location of the lamp in the trailer.

Example 6

The lamp of any previous example, wherein the control circuit includes an antenna and a wireless receiver.

Example 7

The lamp of any previous example, wherein the control circuit is configured to receive the location of the lamp on the trailer using an antenna and a wireless receiver.

Example 8

The lamp of any previous example, wherein the wireless receiver is configured to operate in accordance with the Bluetooth protocol.

Example 9

The lamp of any previous example, wherein the control circuit controls the amber circuit to blink when the control circuit receives a turn signal command.

Example 10

The lamp of any previous example, wherein the control circuit controls the amber circuit to blink when a turning and a braking command are received by the control circuit.

Example 11

The lamp of any previous example, wherein the control circuit controls the red circuit to alternate illumination with the amber circuit when a running light command is received by the control circuit.

Example 12

The lamp of any previous example, wherein the control circuit controls the red circuit to illuminate at a first intensity when a running light command is received, and at a second intensity that is higher than the first intensity when a braking command is received.

Example 13

The lamp of any previous example, wherein the control circuit receives commands via Power Line Communication (PLC) with a tractor coupled to the trailer.

Example 14

The lamp of any previous example, wherein the control circuit receives commands via Control Area Network (CAN) with a tractor coupled to the trailer.

Example 15

The lamp of any previous example, wherein the memory is included in the control circuit.

Example 16

A lamp assembly for a trailer, comprising:
a first lamp and a second lamp, the first and second lamps each separately having a red lamp and an amber lamp.

Example 17

The lamp assembly of example 16, further comprising:
a control circuit electrically connected to the red and amber lamps.

Example 18

The lamp assembly of example 16 or 17, wherein the lamp includes a memory for storing a location of the lamp in the trailer.

Example 19

The lamp assembly of any one of examples 16-18, wherein the control circuit is configured to activate and deactivate the red and amber lamps based on commands received by the control circuit and the location of the individual lamp.

Example 20

The lamp assembly of any one of examples 16-19, wherein the control circuit of the first lamp is configured to activate the red lamp of the first lamp, and control circuit of the second lamp is configured to activate the amber lamp of the second lamp when a braking command and a turn signal command are received by the first and second control circuits.

Example 21

The lamp assembly of any one of examples 16-20, wherein the control circuit of the first and second lamps are configured to activate the amber lamps of both lamps when a hazard light command, or a turn signal command are received.

Example 22

The lamp assembly of any one of examples 16-21, wherein the control circuit of the first and second lamps are configured to blink by alternating activation of the red and amber lamps of both lamps when a hazard light and a running light command are received.

Example 23

The lamp assembly of any one of examples 16-22:
wherein the control circuit of the first lamp is configured to illuminate a first intensity when a braking command and a running light command are received; and
wherein the control circuit of the second lamp is configured to alternate between activation of the red and amber lamps of the second lamp when the braking command and the running light command received.

Example 24

The lamp assembly of any one of examples 16-23, wherein the red lamps of the second lamp are activated at a second intensity that is lower than the first intensity.

Example 25

The lamp assembly of any one of examples 16-24, wherein each of the first and second lamps includes:
a sense resistor electrically connected in series with the red and amber lamps;
wherein the control circuit is electrically connected to the sense resistor and configured to detect changes in the voltage or current for the red or amber lamps using the sense resistor.

Example 26

The lamp assembly of any one of examples 16-25, comprising:
a third lamp and a fourth lamp, the third and fourth lamps each separately having:
a red lamp and an amber lamp; and
a control circuit electrically connected to the red and amber lamps;
wherein the lamp includes a memory for storing a location of the lamp in the trailer;
and wherein the control circuit is configured to activate and deactivate the red and amber lamps based on a combination of commands received by the control circuit and the location of the individual lamp.

Example 27

The lamp assembly of example 26, wherein:
the control circuit of the first lamp is configured to activate the red lamp of the first lamp;
the control circuit of the second lamp is configured to activate the red lamp of the second lamp;
the control circuit of the third lamp is configured to activate the amber lamp of the third lamp; and
the control circuit of the fourth lamp is configured to activate the amber lamp of the fourth lamp;
when a braking command and a when a turn signal command are received.

Example 28

The lamp assembly of any one of examples 26-27, wherein the control circuits of the first, second, third, and fourth lamps are configured to alternate between activating the red and amber lamps when a hazard light and running light command are received.

Example 29

The lamp assembly of any one of examples 26-28, wherein the control circuits of the first, second, third, and fourth lamps are configured to activate the red lamps of each lamp at a first intensity when a brake command is received, and to activate the red lamps at a second lower intensity when the brake command is absent.

Example 30

A method, comprising:
receiving braking and turn signal commands sent from a truck to a control circuit in a trailer, wherein the control circuit is electrically connected to a first lamp and a second lamp mounted to the trailer Example 31

The method of example 30, wherein the first and second lamps include a red circuit operable to produce red light.

Example 32

The method of example 30 or 31, wherein the first and second lamps include an amber circuit operable to produce amber light.

Example 33

The method of any one of examples 30-32, comprising:
activating a red circuit of the first lamp to generate red light, an amber circuit of the second lamp to generate amber light in response to the braking and turn signal commands.

Example 34

The method of any one of examples 30-33, comprising:
receiving a hazard or a turn signal command from the truck;
activating the amber circuit of the first and second lamps to generate amber light in response to the hazard and turn signal commands.

Example 35

The method of any one of examples 30-34, comprising:
receiving a hazard and a running light command from the truck; and
alternating activation of the red and amber circuits of the first lamp and the second lamp to flash red and amber light in response to the hazard and running light commands.

Example 36

The method of any one of examples 30-35, comprising:
receiving a braking command, a running light command, and a turning command from the truck;
activating the red circuit of the first lamp at a first intensity; and
using the control circuit of the second lamp to alternate between activating the red and amber circuits of the second lamp.

Example 37

The method of any one of examples 30-36, comprising:
activating the red circuit of the second lamp at a second intensity that is lower than the first intensity.

Example 38

The method of any one of examples 30-37, comprising:
receiving a braking command and receiving a turn signal command sent from the truck;
activating the red circuit of the first lamp;
activating the red circuit of the second lamp;
activating the red circuit of a third lamp; and
activating the amber circuit of a fourth lamp;
wherein the third and fourth lamps include a red circuit and an amber circuit and a control circuit configured to control the red and amber circuits.

Example 39

The method of any one of examples 30-38, comprising:
alternating between the red and amber circuits using the respect control circuits of the first, second, third, and fourth lamps when the respective control circuits receive a hazard light and running light command from the truck.

Example 40

The method of any one of examples 30-39, comprising:
activating the red circuit of the first, second, third, and fourth lamps at a first intensity when receiving a brake command from the truck.

Example 41

The method of any one of examples 30-40, comprising:
activating the red circuit of the first, second, third, and fourth lamps at a second, lower, intensity when the running light command is received from the truck.

Example 42

The method of any one of examples 30-41, comprising:
receiving a running light command and a turning command from the truck;
activating the red circuit of the first lamp;
activating the red circuit of the second lamp; and
using the control circuit of the third and fourth lamps to alternate between activating the red and amber circuits of the third and fourth lamps.

Example 43

The method of any one of examples 30-42, wherein the braking and turn signal commands are received by the control circuit via power line communication (PLC).

Example 44

The method of any one of examples 30-43, wherein the braking and turn signal commands are received via a control area network (CAN).

Glossary of Terms and Alternative Wordings

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.9375 and 4.8125.

"Activate" generally is synonymous with "providing power to", or refers to "enabling a specific function" of a circuit or electronic device that already has power.

"And/or" is inclusive here, meaning "and" as well as "or". For example, "P and/or Q" encompasses, P, Q, and P with Q; and, such "P and/or Q" may include other elements as well.

"Antenna" or "Antenna System" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff' angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Blink" generally refers to intermittent activation of a lamp. For example, in the case of a turn signal lamp for a vehicle, the lamp intermittently emits light. Specifically, the lamp alternates between emitting light in an activated state and emitting no light in a deactivated state. This results in a period of light emission followed by a period of no light emission. In another example, a lamp may blink by alternating between emitting multiple different colors of light. In another aspect, a lamp may blink by alternating the intensity of light emitted by the lamp from a first lower intensity to a second higher intensity. In yet another example, the lamp may blink by combining alternating colors, alternating intensity, and/or activating and deactivating, or any combination thereof.

"Bluetooth Protocol" or "Bluetooth" generally refers to a wireless technology standard used for exchanging data between fixed and mobile devices over short distances using short-wavelength UHF radio waves in the industrial, scientific and medical radio bands, from 2.402 GHz to 2.480 GHz, and building personal area networks (PANs). It was originally conceived as a wireless alternative to RS-232 data cables.

Bluetooth is a standard wire-replacement communications protocol primarily designed for low power consumption, with a short range based on low-cost transceiver microchips in each device. Because the devices use a radio (broadcast) communications system, they do not have to be in visual line of sight of each other; however, a quasi-optical wireless path must be viable. Range is power-class-dependent, but effective ranges vary in practice Officially Class 3 radios have a range of up to 1 meter (3 ft), Class 2, most commonly found in mobile devices, 10 meters (33 ft), and Class 1, primarily for industrial use cases, 100 meters (300 ft). Bluetooth Marketing qualifies that Class 1 range is in most cases 20-30 meters (66-98 ft), and Class 2 range 5-10 meters (16-33 ft). The actual range achieved by a given link will depend on the qualities of the devices at both ends of the link, as well as the air conditions in between, and other factors.

The effective range varies depending on propagation conditions, material coverage, production sample variations, antenna configurations and battery conditions. Most Bluetooth applications are for indoor conditions, where attenuation of walls and signal fading due to signal reflections make the range far lower than specified line-of-sight ranges of the Bluetooth products.

Most Bluetooth applications are battery-powered Class 2 devices, with little difference in range whether the other end of the link is a Class 1 or Class 2 device as the lower-powered device tends to set the range limit. In some cases, the effective range of the data link can be extended when a Class 2 device is connecting to a Class 1 transceiver with both higher sensitivity and transmission power than a typical Class 2 device. Mostly, however, the Class 1 devices have a similar sensitivity to Class 2 devices. Connecting two Class 1 devices with both high sensitivity and high power can allow ranges far in excess of the typical 100 m, depending on the throughput required by the application. Some such devices allow open field ranges of up to 1 km and beyond between two similar devices without exceeding legal emission limits.

The Bluetooth Core Specification mandates a range of not less than 10 meters (33 ft), but there is no upper limit on actual range. Manufacturers' implementations can be tuned to provide the range needed for each case.

"Brake Lamp" generally refers to a lamp (usually red) attached to the rear of a vehicle that illuminates when the brakes are applied to serve as a warning to fellow drivers. As used herein, the term "brake lamp" includes stop lamps as that term is defined under the present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a nonconductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Contact" means here a condition or state where at least two objects are physically touching. As used, contact requires at least one location where objects are directly or indirectly touching, with or without any other member(s) material in between.

"Control Circuit" generally refers to a circuit configured to provide signals or other electrical impulses that may be received and interpreted by the controlled device to indicate how it should behave.

"Connected in Series" generally refers to an electrical connection of two or more components where current passes through the first component and into the second component, and where the current passing through the two components is the same.

"Control Area Network (CAN)" generally refers to a communication system and network protocol that may be used for intercommunication between components or subsystems of a vehicle. A CAN (sometimes referred to colloquially as a "CAN bus") allows one or more microcontrollers or CAN enabled devices to communicate with each other in real time without a host computer. A CAN may physically connect all nodes together through a two wire bus. The wires may be a twisted pair cable with a 120-ohm characteristic impedance. These wires may be thought of as "high" and "low" connections.

CAN may be thought of as an example of a multi-master serial bus for connecting Electronic Control Units (ECUs) also referred to as "nodes". Two or more nodes are required on the CAN network to communicate. The complexity of the node can range from a simple I/O device such as a sensor, an active device such as a lamp, transmission, or brake actuator, or an embedded computer or ECU with a CAN interface. A node may also be a gateway allowing a standard computer to communicate over a network connection such as a Universal Serial Bus (USB) or Ethernet port allowing outside devices to be selectively added or removed from the CAN network.

A CAN bus does not require any addressing schemes, as the nodes of the network use unique identifiers that may be provided by programming the individual node before use, or reprogramming between uses. This provides the nodes with information regarding the priority and the urgency of transmitted message.

Each node may include a central processing unit, microprocessor, or host processor. The host processor may be configured to determine what the received messages mean and what messages to transmit in response. A node may be electrically connected to sensors, actuators, lamps, or other electronic devices that can be connected to the host processor. A node may also include a CAN controller, optionally integrated into the microcontroller. The can control may implement the sending and receiving protocols. When receiving, the CAN controller may store the received serial bits from the bus until an entire message is available, which can then be fetched by the host processor (for example, by the CAN controller triggering an interrupt). When sending, the host processor may send the transmit message(s) to the CAN controller, which transmits the bits serially onto the bus when the bus is free. A node may also include a transceiver. When receiving: the transceiver may convert the data stream from CAN bus levels to levels that the CAN controller uses. It may have protective circuitry to protect the CAN controller. When transmitting, the transceiver may convert the data stream from the CAN controller to CAN bus levels.

Each node may be configured to send and receive messages, but not simultaneously. A message or Frame consists primarily of the ID (identifier), which represents the priority of the message, and up to eight data bytes. A CRC, acknowledge slot (ACK) and other overhead are also part of the message. The improved CAN FD extends the length of the data section to up to 64 bytes per frame. The message is transmitted serially onto the bus using a non-return-to-zero (NRZ) format and may be received by all nodes.

CAN data transmission may use a lossless bitwise arbitration method of contention resolution. This arbitration method may require all nodes on the CAN network to be synchronized to sample every bit on the CAN network at the same time. Thus data may be transmitted without a clock signal in an asynchronous format.

The CAN specifications may use the terms "dominant" bits and "recessive" bits where dominant is a logical 0 (actively driven to a voltage by the transmitter) and recessive is a logical 1 (passively returned to a voltage by a resistor). The idle state may be represented by the recessive level (logical 1). If one node transmits a dominant bit and another node transmits a recessive bit then a collision results and the dominant bit "wins". This means there is no delay to the higher-priority message, and the node transmitting the lower priority message automatically attempts to retransmit, for example, six bit clocks after the end of the dominant message.

All nodes on the CAN network generally operate at the same nominal bit rate, but noise, phase shifts, oscillator tolerance and oscillator drift mean that the actual bit rate may not be the same as the nominal bit rate. Since a separate clock signal is not used, a means of synchronizing the nodes is used. Synchronization is helpful during arbitration since the nodes in arbitration may see both their transmitted data and the other nodes' transmitted data at the same time. Synchronization is also helpful to ensure that variations in oscillator timing between nodes do not cause errors.

Synchronization may start with a hard synchronization on the first recessive to dominant transition after a period of bus idle (the start bit). Resynchronization may occur on every recessive to dominant transition during the frame. The CAN controller may expect the transition to occur at a multiple of the nominal bit time. If the transition does not occur at the exact time the controller expects it, the controller adjusts the nominal bit time accordingly.

Examples of lower-layer (e.g. levels 1 and 2 of the ISO/OSI model), are commercially available from the International Standardization Organization (ISO) and include ISO 11898-1 through 11898-6, as well as ISO 16845-1 and 16845-2.

CAN standards may not include application layer protocols, such as flow control, device addressing, and transportation of data blocks larger than one message, as well as, application data. Other CAN standards are available that are optimized for specific fields of use. These include, but are not limited to:

ARINC 812 or ARINC 825 (for the aviation industry)
CANopen—EN 50325-4 (used for industrial automation)
DeviceNet (used for industrial automation)
EnergyBus—CiA 454 (used for light electrical vehicles)
ISOBUS—ISO 11783 (agriculture)
ISO-TP—ISO 15765-2 (Transport protocol for automotive diagnostic)
SAE J1939 (In-vehicle network for buses and trucks)
MilCAN
NMEA 2000—IEC 61162-3 (marine industry)
Unified Diagnostic Services (UDS)—ISO 14229 (automotive diagnostics)
CANaerospace—Stock (for the aviation industry)
CAN Kingdom—Kvaser (embedded control system)
CCP/XCP (automotive ECU calibration)
GMLAN—General Motors (for General Motors)
RV-C—RVIA (used for recreational vehicles)
SafetyBUS p—Pilz (used for industrial automation)
UAVCAN (aerospace and robotics)

"Current" generally refers to the rate of flow of electric charge past a point or region of an electric circuit. An electric current is said to exist when there is a net flow of electric charge through a region.

"Electrically Connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Hazard Light" generally refers to a warning signal provided by flashing multiple lamps, usually amber, simultaneously and in phase. Hazard lights may include, but are not limited to, side marker lamps, tail lamps, brake lamps, clearance lamps, and/or intermediate side mark lamps as these terms are defined under the present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Intensity" generally refers a measure of the wavelength-weighted power emitted by a light source in a particular direction per unit solid angle. It mainly serves to establish the distribution of the light given off by a lit surface depending on the direction. In mathematical terms, luminous intensity is defined as the quotient of the elementary luminous flux by the elementary solid angle in which it is propagated. It is expressed in candela (cd). In another aspect, intensity is a measure of the radiant power emitted by an object in a given direction, and is dependent on the wavelength of light being emitted.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-hallide, mercury-vapor, sulfer, neon, sodium-vapor, or others.

"LED Lamp" generally refers to an electrical device that uses Light Emitting Diodes (LEDs) to produce light using electrical power. A lamp may include a single LED, or multiple LEDs.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Multiple" as used herein is synonymous with the term "plurality" and refers to more than one, or by extension, two or more.

"Optionally" as used herein means discretionary; not required; possible, but not compulsory; left to personal choice.

"Power Connector" generally refers to devices or assemblies that allow electrical power to be selectively applied from one circuit to another. Examples include mechanical plugs and sockets or other similar devices that allow an electrical connection to be made between to circuits. A power connector may be configured with multiple pins, terminals, or other contact points to connect multiple cables or circuits together within the same physical connector. Examples include, but are not limited to, industrial and multiphase plugs and sockets, power plugs and receptacles that comply with the National Electrical Manufacturers Association (NEMA) for providing AC power, cylindrical or coaxial power connectors commonly used to carry DC power, snap and lock DC power connectors, Molex connectors, Tamiya connectors commonly used on radio-control vehicle battery packs and chargers, Anderson Powerpole connectors, Society of Automotive Engineers (SAE) connector which is a hermaphrodite two-conductor DC connector commonly used for solar and automotive applications, Universal Serial Bus (USB) connectors and sockets, as well as 4, 5, 6, and 7-way (or more) trailer wiring connectors and sockets that are used to selectively supply power from a towing vehicle to a trailer.

"Power Line Communication (PLC)" generally refers to a system of electronic communication that transmits and receives signals on the same circuit used to transfer power. Examples including system that send data over common AC wiring in a home, or Broadband over Power Line (BPL) systems for carrying network traffic over high voltage transmission lines, as well as systems for in-vehicle communications.

In the vehicle context, data, voice, music and video signals may be transferred to throughout a vehicle by over direct current DC battery power-line. One example of is DC-BU, a technology for reliable and economical communication over noisy DC or AC power lines. Digital input data may be modulated and carried over the power line and then demodulated into the original digital data up receipt.

In DC-BUS or other PLC implementations, the signaling technology is byte oriented, allowing transfer of a single UART data byte or more over noisy channel (such as the powerline) at bit-rate up to 115.2 kbit/s, each transmitted byte is protected against errors caused by noisy environment. This method may operate on a channel ranging in the HF band. A narrow band signaling modulation may be used that is based on a combination of phase changes to transfer each byte. There is no restriction to the number of bytes. Any Universal Asynchronous Receiver-Transmitter (UART) based standards such as RS-232, RS-485 and LIN-bus can use a DC-BUS as a physical layer (as referred to in the OSI model).

"Predominately" as used herein is synonymous with greater than 50%.

"Running Light" generally refers to lights included with a trailer or vehicle to provide visual cues (especially in the dark) as to the vehicle's presence and/or physical dimensions. These lamps are generally amber, but may also be other colors such as red in the case of rear facing running lamps. Running lights may include, but are not limited to, side marker lamps, tail lamps, clearance lamps, and intermediate side mark lamps as these terms are defined under the present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Sense Resistor" generally refers to a resistor placed in a current path to allow the current to be measured. The voltage across the sense resistor is proportional to the current that is being measured and an amplifier produces a voltage or current that drives the measurement.

"Terminal" generally refers to a plug, socket or other connection (male, female, mixed, hermaphroditic, or otherwise) for mechanically and electrically connecting two or more wires or other conductors.

"Trailer" generally refers to a vehicle without an engine, often in the form of a flat frame or a container, that can be pulled by another vehicle.

"Turn Signal Lamp" generally refers to lamps positioned on a vehicle or trailer to warn of a change in the direction of travel when activated. Sometimes referred to as "direction indicators" or "directional signals", or as "directionals", "blinkers", "indicators" or "flashers"— turn signal lamps generally mounted near the left and right front and rear corners of a vehicle or trailer. As used herein, the term generally refers to a turn signal lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Unitary Molded Structure" generally refers to a structure formed as a single or uniform entity.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

What is claimed is:

1. A method, comprising:
sending commands to a lamp mounted to a trailer, the lamp including:
a red circuit operable to produce red light;
an amber circuit operable to produce amber light; and
a control circuit responsive to the commands and electrically connected to the red and amber circuits;
activating the red circuit of the multiple lamps to generate red light or the amber circuit of the multiple lamps to generate amber light in response to the commands using the control circuit; and
detecting changes in the voltage or current for the red or amber lamps using the control circuit electrically connected to a sense resistor that is in series with the red and amber lamps.

2. The method of claim 1, comprising:
receiving location information defining a position of the lamp on the trailer.

3. The method of claim 2, wherein activating the red or amber circuits includes using the position of the lamp to determine when to activate the red and amber circuits in response to the commands.

4. The method of claim 1, wherein the lamp is positioned as a stop-turn-tail lamp at a rear location of the trailer.

5. The method of claim 4, comprising:
activating the red circuit at a low intensity in response to a running light command.

6. The method of claim 4, comprising:
activating the red circuit at a high intensity in response to a brake light command.

7. The method of claim 4, comprising:
activating the amber circuit at a high intensity in response to turn signal command.

8. The method of claim 4, comprising:
alternating between the red circuit at a high intensity, and the amber circuit at the high intensity in response to a brake light and turn signal command.

9. The method of claim 4, comprising:
activating and deactivating the amber circuit at a high intensity while the red circuit is activate at the high intensity in response to a brake light and turn signal command.

10. The method of claim 4, comprising:
maintaining the red circuit in an active state at a low intensity; and
activating and deactivating the amber circuit at a high intensity in response to a running light and turn signal command.

11. The method of claim 4, comprising:
maintaining the red circuit in an active state at a low intensity; and
activating and deactivating the amber circuit at a high intensity in response to a running light and hazard signal command.

12. The method of claim 1, wherein the lamp is positioned at a clearance lamp or side marker lamp location of the trailer.

13. The method of claim 12, comprising:
activating the amber circuit at a low intensity in response to a running light command.

14. The method of claim 12, comprising:
maintaining the red circuit in an inactive state regardless of the command received.

15. The method of claim 1, wherein the commands are sent via power line communication (PLC).

16. The method of claim 1, wherein the commands are sent via a control area network (CAN).

17. The method of claim 1, comprising:
comparing the changes in the current flow with predetermined thresholds using the control circuit.

18. The method of claim 17, comprising:
initiating notification of a failure using the control circuit when the current flow is outside the predetermined thresholds.

* * * * *

UNITED STATES PATENT AND TRADEMARK OFFICE
CERTIFICATE OF CORRECTION

| | | |
|---|---|---|
| PATENT NO. | : 12,054,093 B2 | Page 1 of 1 |
| APPLICATION NO. | : 18/452031 | |
| DATED | : August 6, 2024 | |
| INVENTOR(S) | : Sankalp Pampattiwar et al. | |

It is certified that error appears in the above-identified patent and that said Letters Patent is hereby corrected as shown below:

On the Title Page

Item (63), should read:
Related U.S. Application Data
Continuation of 17/556,020 filed on Dec. 20, 2021, now Pat. No. 11,772,547, which is a continuation of 17/073,708 filed on Oct. 19, 2020, now Pat. No. 11,203,286.

Signed and Sealed this
Eighth Day of April, 2025

Coke Morgan Stewart
*Acting Director of the United States Patent and Trademark Office*